US010299299B2

(12) United States Patent
Vandikas et al.

(10) Patent No.: US 10,299,299 B2
(45) Date of Patent: May 21, 2019

(54) UNIFIED AND DISTRIBUTED CONNECTIVITY CONFIGURATION ACROSS OPERATORS

(71) Applicant: TELEFONAKTIEBOLAGET LM ERICSSON (PUBL), Stockholm (SE)

(72) Inventors: Konstantinos Vandikas, Solna (SE); Ioannis Fikouras, Stockholm (SE); Rafia Inam, Västerås (SE); Athanasios Karapantelakis, Stockholm (SE); Qiang Li, Täby (SE); Leonid Mokrushin, Uppsala (SE); Aneta Vulgarakis Feljan, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/705,697

(22) Filed: Sep. 15, 2017

(65) Prior Publication Data
US 2019/0090286 A1 Mar. 21, 2019

(51) Int. Cl.
*H04W 76/10* (2018.01)
*G06F 16/951* (2019.01)
*H04L 29/12* (2006.01)

(52) U.S. Cl.
CPC .......... *H04W 76/10* (2018.02); *G06F 16/951* (2019.01); *H04L 61/1511* (2013.01); *H04L 61/6018* (2013.01)

(58) Field of Classification Search
CPC .............................. H04W 76/10; H04W 48/18
See application file for complete search history.

(56) References Cited

U.S. PATENT DOCUMENTS

| 9,948,603 | B1* | 4/2018 | Lee .................... H04L 61/3015 |
| 2013/0285794 | A1* | 10/2013 | Hansen ................ G01S 5/0294 |
| | | | 340/8.1 |
| 2014/0080478 | A1* | 3/2014 | Costelloe ............... H04W 8/24 |
| | | | 455/423 |
| 2016/0066261 | A1* | 3/2016 | Nasielski .............. H04W 48/18 |
| | | | 455/406 |
| 2016/0344686 | A1* | 11/2016 | Guo .................... H04L 12/6418 |
| 2018/0248699 | A1* | 8/2018 | Andrade ............... H04L 9/3231 |

OTHER PUBLICATIONS

ETSI TS 129 303 V.12.4.0 (Oct. 2014) Universal Mobile Telecommunication System (UMTS); LTE; Domain Name System Procedures; Stage 3 (3GPP TS 29.303 version 12.4.0 Release 12), 66 pages.
PCT Patent Application No. PCT/EP2017/066162 entitled "Method and Devices for Hardware Identifier-Based Subscription Management", Filed Jun. 29, 2017, 39 pages.
"3rd Generation Partnership Project; Technical Specification Group Core Network and Terminals; Domain Name System Procedures; Stage 3 (Release 14)," 3GPP Standard Technical Specification, 3GPP TS 29.303, 3rd Generation Partnership Project (3GPP), Jun. 19, 2017, version 14.2.0, pp. 1-71.
Quim et al., "Estudio de estabilidad para la seleccion de una formulation de un producto probiotico," Tesis doctoral, Universidad Nacional de Colombia, Jan. 1, 2013, pp. 1-143.

* cited by examiner

*Primary Examiner* — Myron Wyche

(57) ABSTRACT

A control node (e.g., MME, BSC, RNC), a database (e.g., distributed database) and associated methods are described herein for attaching a UE which is embedded within a device (e.g., vehicle) to a telecommunication network and selecting a gateway (e.g., P-GW, S-GW, SGSN, GGSN) for a connection (e.g., PDN connection) so that the UE can connect to an external network like the Internet.

26 Claims, 6 Drawing Sheets

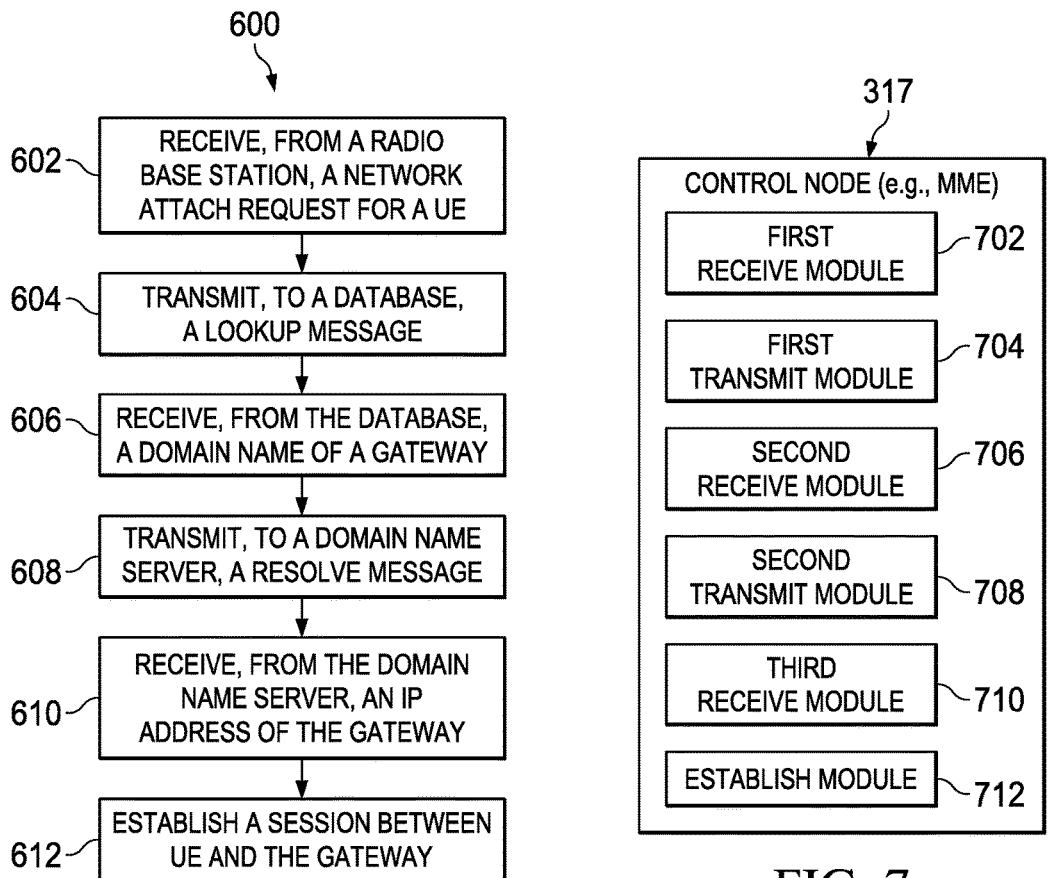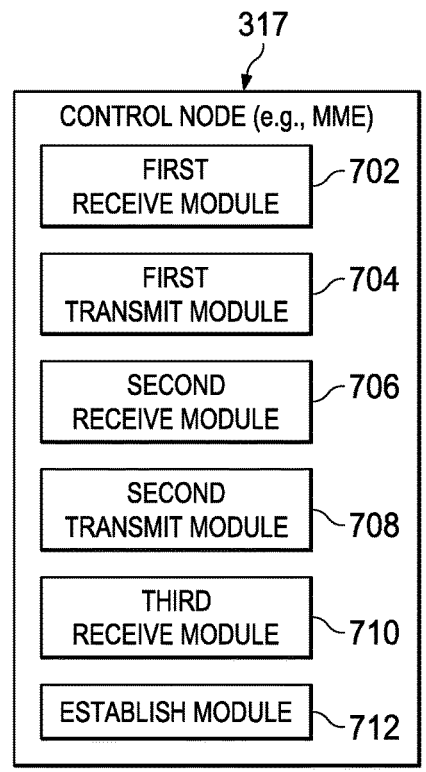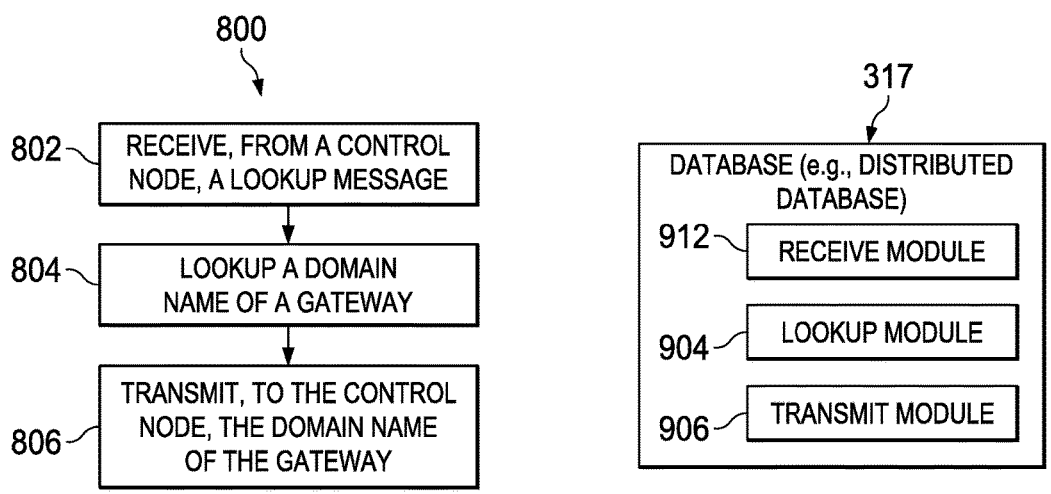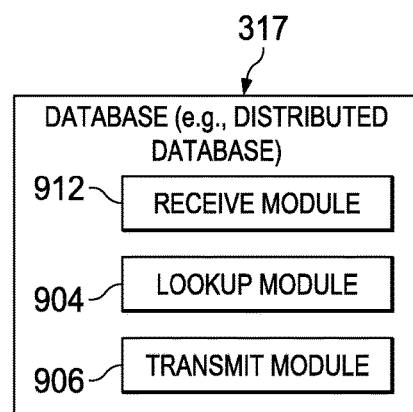
FIG. 6
FIG. 7
FIG. 8
FIG. 9

UNIFIED AND DISTRIBUTED CONNECTIVITY CONFIGURATION ACROSS OPERATORS

RELATED PATENT APPLICATION

This application is related to PCT Patent Application No. PCT/EP2017/066162, filed on Jun. 29, 2017, and entitled "Method and Devices for Hardware Identifier-Based Subscription Management". The disclosure of this document is hereby incorporated herein by reference for all purposes.

TECHNICAL FIELD

The present disclosure relates to a control node (e.g., MME, BSC, RNC), a database (e.g., distributed database) and associated methods for attaching a UE which is embedded within a device to a telecommunication network and selecting a gateway (e.g., P-GW, S-GW, SGSN, GGSN) for a connection (e.g., PDN connection) so that the UE can connect to an external network like the Internet.

BACKGROUND

The following abbreviations and term are herewith defined, at least some of which are referred to within the following description of the present disclosure.
3GPP 3$^{rd}$ Generation Partnership Project
ASIC Application Specific Integrated Circuit
APN Access Point Network
BSC Base Station Controller
BTS Base Transceiver Station
DL Distributed Ledger
DNS Domain Name Server
DSP Digital Signal Processor
EGPRS Enhanced General Packet Radio Service
eNB eNodeB
EPS Evolved Packet System
eUICCID Embedded Universal Integrated Circuit Card Identifier
FQDN Fully Qualified Domain Name
GGSN Gateway GPRS Support Node
GITN Global Trading Item Number
GPRS General Packet Radio Service
GSM Global System for Mobile Communications
HLR Home Location Register
ICCID Integrated Circuit Card Identifier
IMSI International Mobile Subscriber Identity
IoT Internet of Things
IP Internet Protocol
LTE Long-Term Evolution
MSC Mobile Switching Center
MTC Machine-Type Communications
OEM Original Equipment Manufacturer
PCRF Policy and Charging Rules Function
PDN Packet Data Network
P-GW Packet Gateway
MAC Media Access Control
MME Mobility Management Entity
RNC Radio Network Controller
SGSN Serving GPRS Support Node
SIM Subscriber Identity Module
S-GW Serving Gateway
TAI Tracking Area Identity
TS Technical Specification
UE User Equipment
UPC Universal Product Code
VIN Vehicle Identification Number
WCDMA Wideband Code Division Multiple Access
WiMAX Worldwide Interoperability for Microwave Access
Distributed Database: The distributed database can use a block chain (distributed ledger) to maintain a continuously growing list of records, called blocks. Each block contains a timestamp and a link to a previous block. The block chain is typically managed by a peer-to-peer network collectively adhering to a protocol for validating new blocks. By design, the block chain is inherently resistant to modification of the data. Once recorded, the data in any given block cannot be altered retroactively without the alteration of all subsequent blocks and the collusion of the network. Functionally, the block chain can serve as an open, distributed ledger that can record transactions between two parties efficiently and in a verifiable and permanent way. The distributed ledger itself can also be programmed to trigger transactions automatically.

In the current state-of-the-art, a User Equipment's (UE's) Access Point Name (APN) and International Mobile Subscriber Identity (IMSI), associated with the UE'S ICC or eUICC identifier (ICCID or eUICCID respectively), are used to initiate the process of authenticating the UE within a telecommunication network so that a Mobility Management Entity (MME) can setup a session between an eNodeB (eNB) where the UE is attached and with a Serving Gateway (S-GW) and a Packet Gateway (P-GW). This session is also known as a Packet Data Network (PDN) connection. The lookup for the P-GW and the S-GW takes place at the MME which communicates with a Domain Name Server (DNS) to lookup the Internet Protocol (IP) addresses for the P-GW and the S-GW. The IP address of the P-GW is then sent by the MME to the S-GW so that a connection can be setup between the S-GW and the P-GW. This state-of-the-art process for attaching the UE to the telecommunication network and selecting the P-GW and S-GW is discussed in more detail below with respect to FIGS. 1 and 2.

Referring to FIGS. 1 and 2 (PRIOR ART), there are respectively shown a signal flow diagram 100 and an exemplary telecommunication network 200 which are used to describe the state-of-the-art process and the disadvantages associated therewith for attaching the UE 102 to the telecommunication network 200 and selecting the P-GW 104 and the S-GW 120 for the PDN connection so the UE 102 can connect to an external network like the Internet 128. The signal flow diagram 100 has the following steps:

1. The UE 102 (e.g., shown embedded within a vehicle 103 in FIG. 2) transmits an attach request 106 to the eNB 108. The attach request 102 includes the corresponding APN that the UE 102 is using where the APN information relates to the SIM card and the operator who is "managing" the UE 102. See FIG. 2's step 1.

2. The eNB 108 is interested in finding the corresponding MME 110 and this is done by transmitting a TAI (Tracking Area Identity) in a S-NAPTRquery 112 to the DNS 114. See FIG. 2's step 2.

3. The address 115 of the MME 110 is returned by the DNS 114 to the eNB 108. See FIG. 2's step 3.

4. The eNB 108 transmits a network attach request 116 to the MME 110. The network attach request 116 also includes the TAI and the UE's APN. See FIG. 2's step 4.

5. The MME 110 transmits the TAI in a S-NAPTRquery 118 to the DNS 114. See FIG. 2's step 5.

6. The DNS 114 uses the TAI to resolve the IP address 119 of the S-GW 120 and then the DNS 114 transmits the IP address 119 of the S-GW 120 to the MME 110. See FIG. 2's step 6.

7. The MME 110 transmits the UE's APN in a S-NAP-TRquery 122 to the DNS 114. See FIG. 2's step 7.

8. The DNS 114 uses the APN to resolve the IP address 123 of the P-GW 104 and then the DNS 114 transmits the IP address 123 of the P-GW 104 to the MME 110. See FIG. 2's step 8.

9-10. The MME 110 transmits (step 9) a createSessionRequest 124 to the S-GW 120. Then, the S-GW 120 transmits (step 10) a createSessionRequest 126 to the P-GW 104. These steps 9 and 10 create two sessions between the UE 102 and the S-GW 120 and P-GW 104 which allows the UE 102 to reach to an external network such as the Internet 128. See FIG. 2's steps 9 and 10.

This attachment process is standardized in section 5 of 3GPP TS 129.303 V12.4.0 (2014-10) (the contents of which are hereby incorporated by reference herein) and allows an operator of the telecommunications network 200 to have complete control of the different UE's that are attached to its telecommunication network 200. Moreover, the different nodes including the eNB 108, the MME 110, the DNS 114, the P-GW 104, and the S-GW 120 that are involved in the attachment process are controlled exclusively by the operator. Therefore, all the required configurations and settings needed in the DNS 114 for looking up the IP addresses of different S-GWs and P-GWs are done manually by the operator thus excluding the use of an external DNS or other S-GWs and even P-GWs that may belong to a third party such as another operator or an Original Equipment Manufacturer (OEM).

A main limitation of this state-of-the-art approach becomes evident when new customers (e.g., non-telecommunication customers, OEMs) are trying to deploy their devices which have UEs embedded therein in the telecommunications network 200. An example here could be Panasonic who is selling high-end cameras with embedded SIM cards. The problem that Panasonic has when deploying these devices is that they are expected to work out of the box in any part of the world and in any telecommunications network. However, to achieve this is a complex and time-consuming process because for such a scenario to become a reality under the current state-of-the-art, Panasonic would have to make arrangements with every regional operator in the world. However, from the current standardized 3GPP perspective as described above, the telecommunication network 200 is not designed to trust third parties (e.g., OEMs) especially when it comes to identifying which devices can access their network and how their traffic should be routed. Hence, there is a need to address the aforementioned problems associated with state-of-the-art attachment process. This need and other needs are addressed herein by the present disclosure.

SUMMARY

A control node (e.g., MME, BSC, RNC), a database (e.g., distributed database, plain database) and various methods for addressing the aforementioned problems associated with the state-of-the art attachment process are described in the independent claims. Advantageous embodiments of the control node, the database, and the various methods are further described in the dependent claims.

In one aspect, the present disclosure provides a control node (e.g., MME, BSC, RNC) configured to assist in attaching a user equipment (UE) to a telecommunication network. In one embodiment, the control node comprises a processor and a memory that stores processor-executable instructions, wherein the processor interfaces with the memory to execute the processor-executable instructions, whereby the control node is operable to perform a first receive operation, a first transmit operation, a second receive operation, a second transmit operation, a third receive operation, and an establish operation. In the first receive operation, the control node receives, from a radio base station (e.g., BTS, nodeB, eNodeB), a network attach request which comprises at least a hardware identifier (e.g., MAC address) associated with the UE. In the first transmit operation, the control node transmits, to a database (e.g., distributed database, plain database), a lookup message which comprises at least the hardware identifier associated with the UE. In the second receive operation, the control node receives, from the database, a domain name of a gateway (e.g., P-GW, S-GW, SGSN, GGSN), wherein the hardware identifier associated with the UE and the domain name was provided to the database by a manufacturer of a device which has the UE embedded therein. In the second transmit operation, the control node transmits, to a Domain Name Server (DNS), a resolve message including the domain name of the gateway. In the third receive operation, the control node receives, from the DNS, an Internet Protocol (IP) address of the gateway. In the establish operation, the control node establishes a session between the UE and the gateway which allows the UE to communicate with an external network (e.g., Internet). An exemplary advantage of the control node implementing these operations is that it enables the manufacturer to control which gateway is selected to attach the UE to the telecommunications network and this selected gateway does not need to be a gateway that is sanctioned by the operator of the telecommunications network.

In another aspect, the present disclosure provides a method in a control node (e.g., MME, BSC, RNC) to assist in attaching a user equipment (UE) to a telecommunication network. In one embodiment, the method comprises a first receiving step, a first transmitting step, a second receiving step, a second transmitting step, a third receiving step, and an establishing step. In the first receiving step, the control node receives, from a radio base station (e.g., BTS, nodeB, eNodeB), a network attach request which comprises at least a hardware identifier (e.g., MAC address) associated with the UE. In the first transmitting step, the control node transmits, to a database (e.g., distributed database, plain database), a lookup message which comprises at least the hardware identifier associated with the UE. In the second receiving step, the control node receives, from the database, a domain name of a gateway (e.g., P-GW, S-GW, SGSN, GGSN), wherein the at hardware identifier associated with the UE and the domain name was provided to the database by a manufacturer of a device which has the UE embedded therein. In the second transmitting step, the control node transmits, to a Domain Name Server (DNS), a resolve message including the domain name of the gateway. In the third receiving step, the control node receives, from the DNS, an Internet Protocol (IP) address of the gateway. In the establishing step, the control node establishes a session between the UE and the gateway which allows the UE to communicate with an external network (e.g., Internet). An exemplary advantage of the method implemented by the control node is that it enables the manufacturer to control which gateway is selected to attach the UE to the telecommunications network and this selected gateway does not need to be a gateway that is sanctioned by the operator of the telecommunications network.

In one aspect, the present disclosure provides a database (e.g., distributed database, plain database) configured to assist in attaching a user equipment (UE) to a telecommunication network. In one embodiment, the database comprises a processor and a memory that stores processor-executable instructions, wherein the processor interfaces with the memory to execute the processor-executable instructions, whereby the database is operable to perform a receive operation, a lookup operation, and a transmit operation. In the receive operation, the database receives, from a control node (e.g., MME, BSC, RNC), a lookup message which comprises at least the hardware identifier (e.g., MAC address) associated with the UE. In the lookup operation, the database looks-up, utilizing the at least the hardware identifier associated with the UE, a domain name of a gateway (e.g., P-GW, S-GW, SGSN, GGSN). The hardware identifier associated with the UE and the domain name was provided to the database by a manufacturer of a device which has the UE embedded therein. In the transmit operation, the database transmits, to the control node, the domain name of the gateway. An exemplary advantage of the database implementing these operations is that it enables the manufacturer to control which gateway is selected to attach the UE to the telecommunications network and this selected gateway does not need to be a gateway that is sanctioned by the operator of the telecommunications network.

In one aspect, the present disclosure provides method in a database (e.g., distributed database, plain database) to assist in attaching a user equipment (UE) to a telecommunication network. In one embodiment, the method comprises a receiving step, a looking-up step, and a transmitting step. In the receiving step, the database receives, from a control node (e.g., MME, BSC, RNC), a lookup message which comprises at least the hardware identifier associated with the UE. In the looking-up step, the database looks-up, utilizing the at least the hardware identifier associated with the UE, a domain name of a gateway (e.g., P-GW, S-GW, SGSN, GGSN). The hardware identifier associated with the UE and the domain name was provided to the database by a manufacturer of a device which has the UE embedded therein. In the transmitting step, the database transmits, to the control node, the domain name of the gateway. An exemplary advantage of the method implemented by the database is that it enables the manufacturer to control which gateway is selected to attach the UE to the telecommunications network and this selected gateway does not need to be a gateway that is sanctioned by the operator of the telecommunications network.

Additional aspects of the present disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIG. 6 is a flowchart of a method implemented in a control node (e.g., MME) shown in FIGS. 3-4 in accordance with an embodiment of the present disclosure;

FIG. 7 is a block diagram illustrating a structure of the control node (e.g., MME) shown in FIGS. 3-4 in accordance with an embodiment of the present disclosure;

FIG. 8 is a flowchart of a method implemented in a database (e.g., distributed database) shown in FIGS. 3-5 in accordance with an embodiment of the present disclosure; and, FIG. 9 is a block diagram illustrating a structure of the database (e.g., distributed database) shown in FIGS. 3-5 in accordance with an embodiment of the present disclosure.

DETAILED DESCRIPTION

Figure 1:
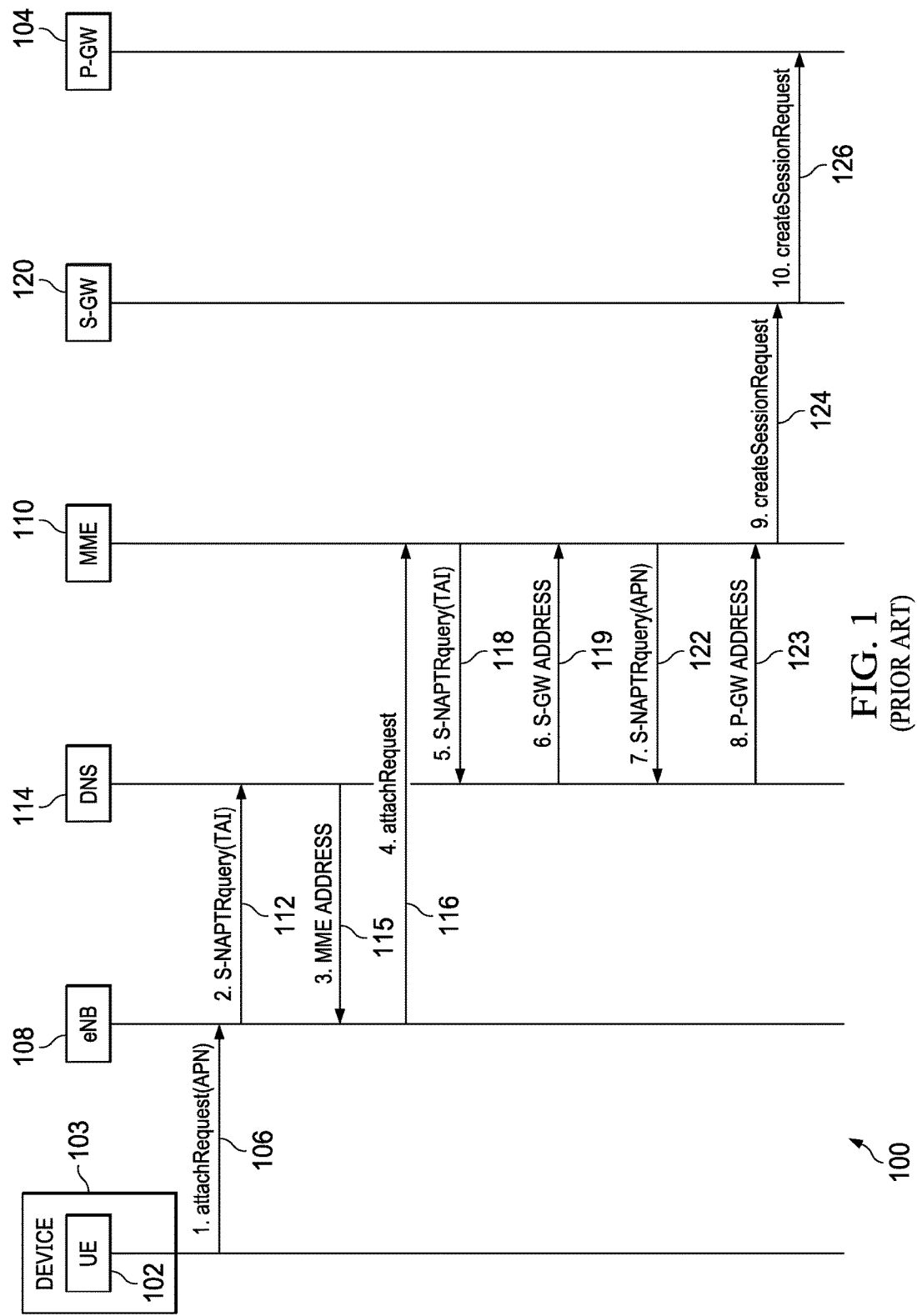
FIG. 1 (PRIOR ART) is a signal flow diagram which is used to describe the state-of-the-art process and the disadvantages therewith for attaching the UE to the telecommunication network and selecting the P-GW and the S-GW for the PDN connection so the UE can connect to an external network like the Internet.
Figure 2:
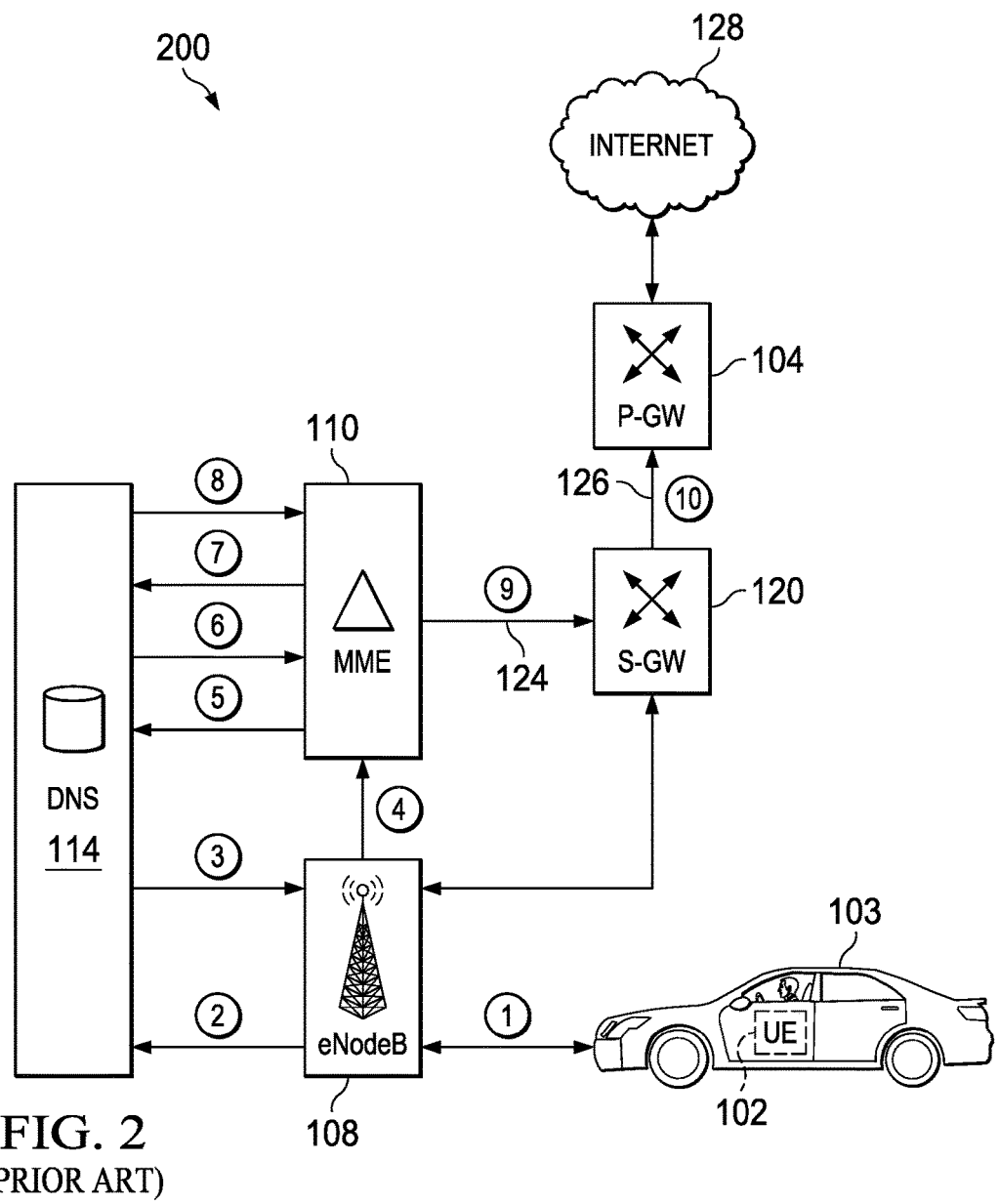
FIG. 2 (PRIOR ART) is a diagram of an exemplary telecommunications network which is used to describe the state-of-the-art process and the disadvantages associated therewith for attaching the UE to the telecommunication network and selecting the P-GW and the S-GW for the PDN connection so the UE can connect to an external network like the Internet.
Figure 3:
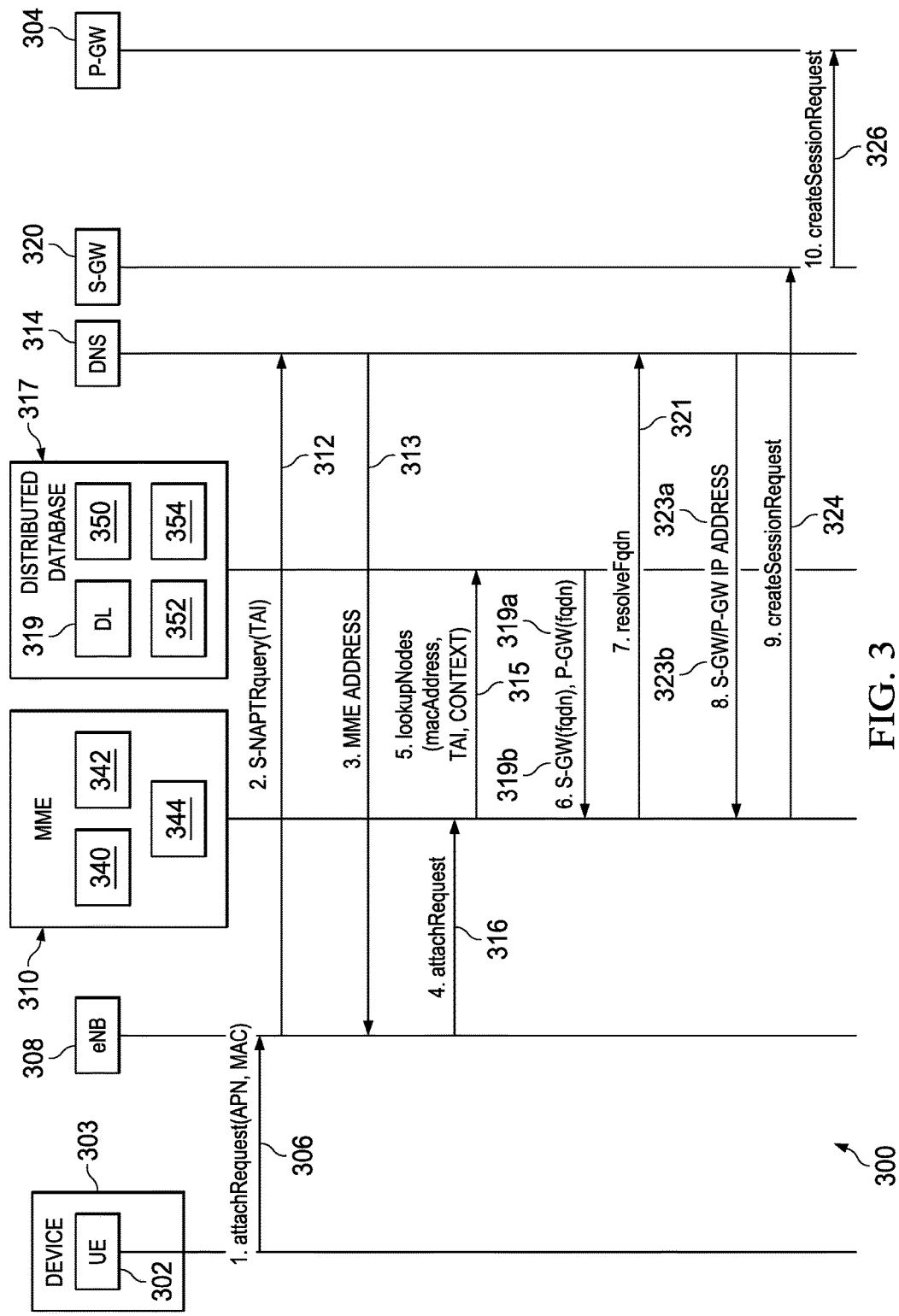
FIG. 3 is a signal flow diagram which is used to describe a new process in accordance with an embodiment of the present disclosure for attaching the UE to the telecommunication network and selecting the P-GW and the S-GW for the PDN connection so the UE can connect to an external network like the Internet.
Figure 4:
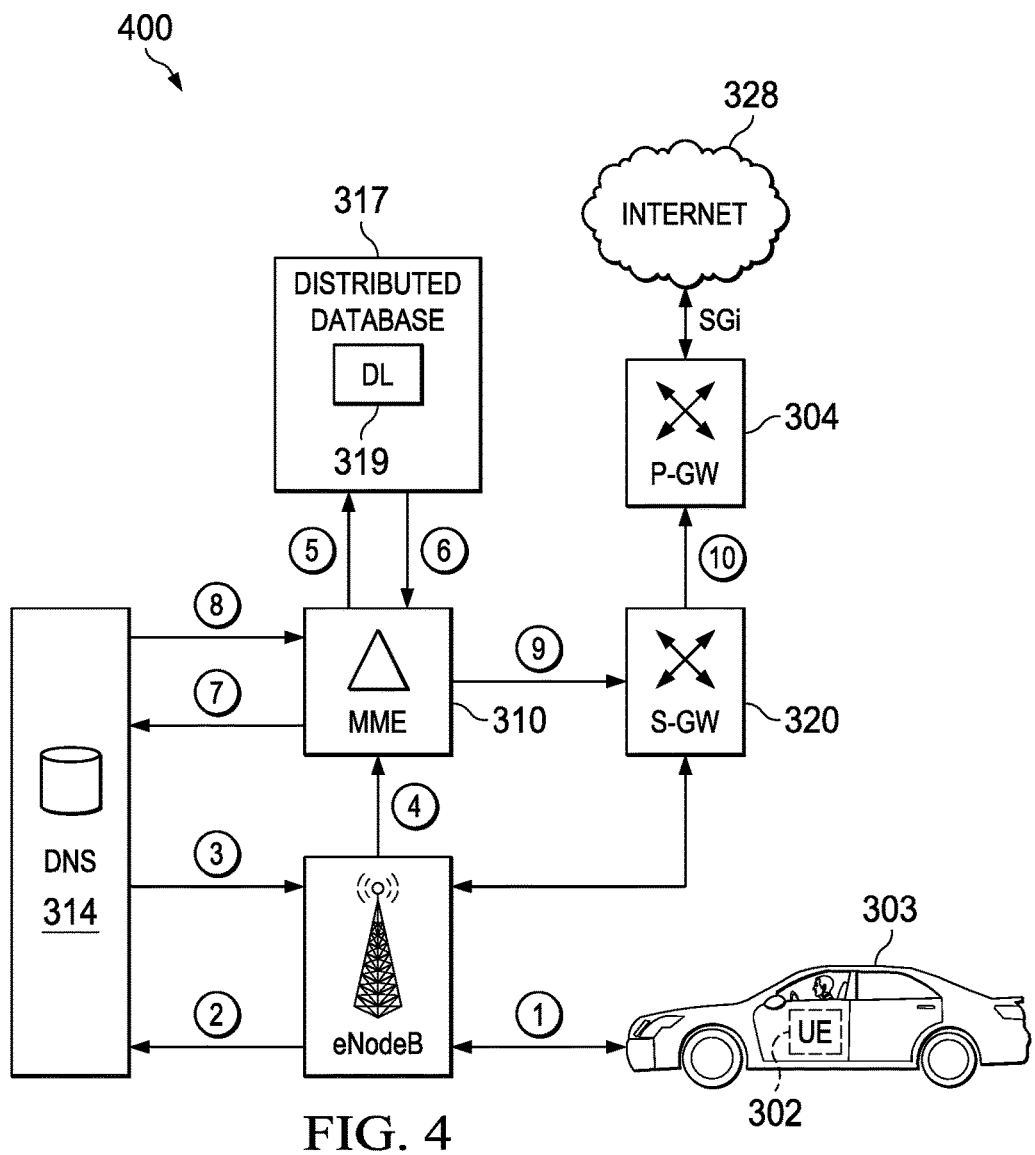
FIG. 4 is a diagram of an exemplary telecommunications network which is used to describe a new process in accordance with an embodiment of the present disclosure for attaching the UE to the telecommunication network and selecting the P-GW and the S-GW for the PDN connection so the UE can connect to an external network like the Internet.

Referring to FIGS. 3 and 4, there are respectively shown a signal flow diagram 300 and an exemplary telecommunication network 400 which are used to describe a new process in accordance with an embodiment of the present disclosure for attaching a UE 302 to the telecommunication network 400 and selecting a P-GW 304 and a S-GW 320 for a PDN connection so the UE 302 can connect to an external network like the Internet 328. The signal flow diagram 300 has the following steps:

1. The UE 302 (e.g., shown embedded within a vehicle 303 in FIG. 4) transmits a network attach request 306 to the eNB 308. The network attach request 306 includes the corresponding APN and Media Access Control (MAC) address (or other hardware identifier of the UE 302) associated with the UE 302. See FIG. 4's step 1.

2. The eNB 308 finds the corresponding MME 310 by transmitting a TAI (Tracking Area Identity) in a S-NAPTRquery 312 to the DNS 314. See FIG. 4's step 2.

3. The address 313 of the MME 310 is returned by the DNS 314 to the eNB 308. See FIG. 4's step 3.

4. The eNB 308 transmits a network attach request 316 to the MME 310. The network attach request 316 also includes the TAI, the UE's APN, and the UE's MAC address (or other hardware identifier of the UE 302) for the purposes of identifying and authenticating the UE 302. See FIG. 4's step 4.

5. The MME 310 transmits a LookupNodes message 315 which contains the TAI, the UE's MAC address (or other hardware identifier), and an optional context to a Distributed Database 317 that maintains a Distributed Ledger (DL) 319 (e.g., block chain 319) and performs a lookup (optional context-based lookup) for the domain name of the P-GW 304 and the S-GW 320. See FIG. 4's step 5. This step is what enables the OEM (manufacturer) to control which P-GW 304 and/or S-GW 320 is selected to attach the UE 302 to the telecommunications network 400 and this selected P-GW 304 and/or S-GW 320 does not need to be a P-GW and/or S-GW that is sanctioned by the operator of the telecommunications network 400. A detailed discussion on how the Distributed Database 317 performs the context based lookup for the P-GW 304 and the S-GW 320 is provided below with respect to FIG. 5.

6. The Distributed Database 317 performs the context based lookup and transmits a domain name 319*a*, 319*b* (e.g., a P-GW (fqdn) 319*a*, a S-GW (fqdn) 319*b*) to the MME 310. See FIG. 4's step 6. The P-GW (fqdn) 319*a* and the S-GW (fqdn) which respectively indicate a hostname for P-GW 304 (e.g., pgw.panasonic.com) and the S-GW 320 (e.g., sgw.panasonic.com).

7. The MME 310 then sends a resolve message 321 (e.g., resolveFqdn 321) to the DNS 314. See FIG. 4's step 7. The DNS 314 upon receiving the resolve message 321 (e.g., resolveFqdn 321) performs a FQDN resolution which yields the IP addresses 323*a* and 323*b* for the P-GW 304 and the S-GW 320.

8. The DNS 314 transmits the IP addresses 323*a* and 323*b* of the P-GW 304 and the S-GW 320 to the MME 310. See FIG. 4's step 8.

9-10. The MME 310 transmits (step 9) a createSessionRequest 324 to the S-GW 320. Then, the S-GW 320 transmits (step 10) a createSessionRequest 326 to the P-GW 304. These steps 9 and 10 establish two sessions between the UE 302 and the S-GW 320 and P-GW 304 which allows the UE 302 to communicate with an external network such as the Internet 328. See FIG. 4's steps 9 and 10.

Figure 5:
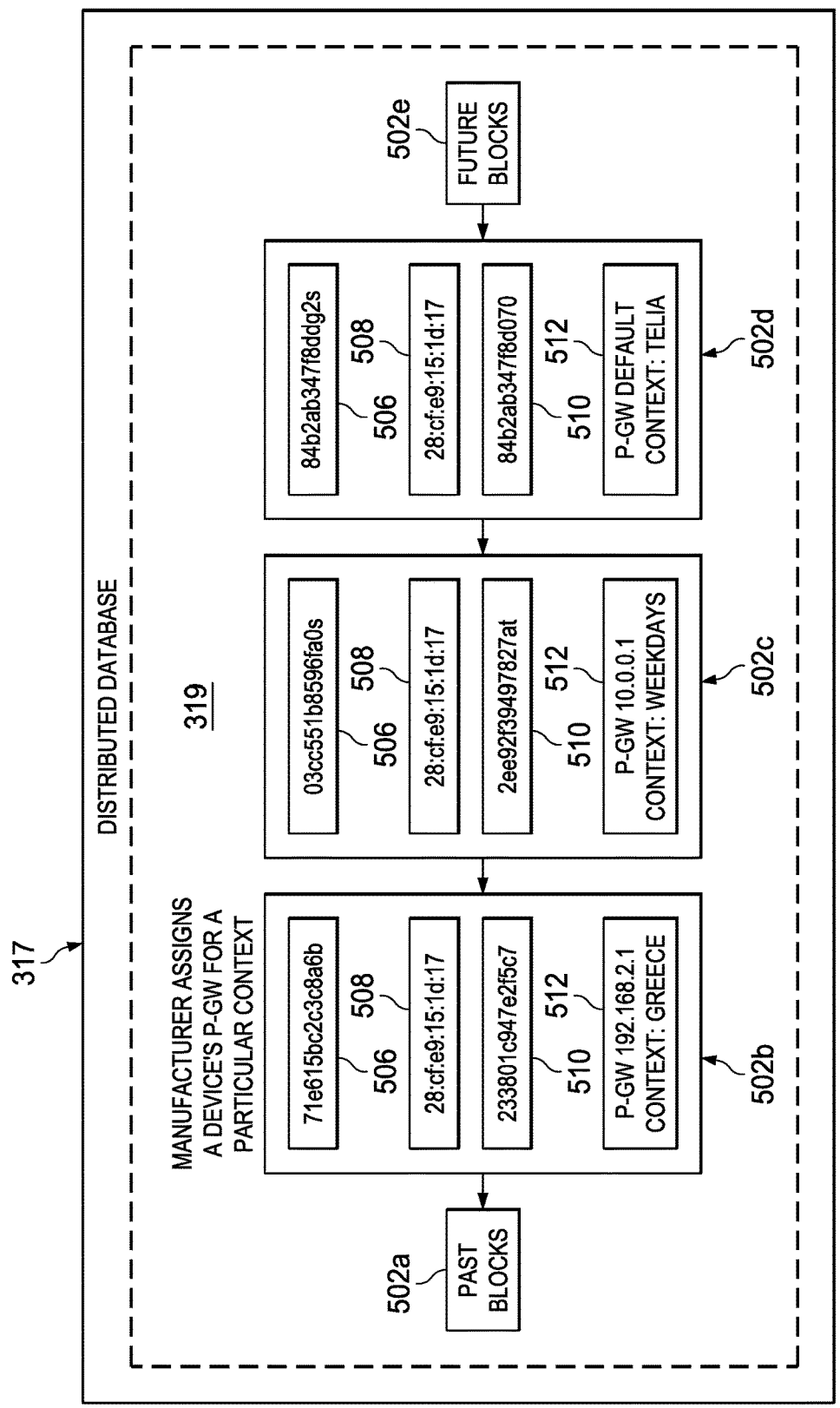
FIG. 5 is a diagram of an exemplary distributed database which is shown in FIGS. 3-4 that has a distributed ledger (e.g., block chain) in accordance with an embodiment of the present disclosure.

Referring to FIG. 5, there is shown the distributed database 317 that has a DL 319 (e.g., block chain 319) including an exemplary collection of records/blocks 502*a* (multiple past blocks 502*a*), 502*b*, 502*c*, 502*d*, and 502*e* (multiple future blocks 502*e*) that are linked together and used when performing a context based lookup for the P-GW 304 and the S-GW 320 as described above with respect to FIGS. 3-4's steps 5-6 in accordance with an embodiment of the present disclosure. In this example, the records 502*b*, 502*c*, and 502*d* each have four elements 506, 508, 510, and 510 which are populated when the OEM (e.g., Panasonic) assigns P-GWs 304 to a device 303 (e.g., high-end camera 303 with a radio module (UE 302) embedded therein) for a particular context (note: in this example the records associated with S-GWs 320 for the OEM's device have not been shown). The first element 506 is produced when the OEM (manufacturer) signs a message with their private key where in this example the message contains the MAC address and the context. For example, the record 502*b* has an element 506 represented by "71e615bc2c3c8a6b" which identifies the OEM (manufacturer) and was produced when the OEM (manufacturer) signed the message cryptographically. The element 506 is used to authenticate the origin of the message.

The second element 508 contains the device's hardware identifier, for example a MAC address. As can be seen, the records 502*b*, 502*c* and 502*d* each have an element 506 with the same MAC address namely "28:cf:e9:15:1d:17". The use of a MAC address as the device's hardware identifier is exemplary. Another example of a unique hardware identifier that could be used is a serial number of the product that the UE 302 (radio module 302) is embedded in, could be the Vehicle Identification Number (VIN) of an automobile 303. Another example of a unique hardware identifier that could be used is a globally unique Global Trading Item Number (GITN) or Universal Product Code (UPC) of the device 303. In all of these cases, the unique hardware identifier can be communicated in an EPS Mobile Identity header of the Initial Attach request 306 between the UE 302 and the eNB 308 as illustrated in FIGS. 3-4.

The third element 510 is a link to the previous block in the chain that is used for verifying the sequence where these transactions have taken place. For example, the record 502*b* has a third element 510 represented by "233801c947e2f5c7" which is a link to the previous block/record 502*a* in the chain that is used for verifying the sequence where these transactions have taken place. One possible way to create the information (e.g., 233801c947e2f5c7) in the third element 510 of record 502*b* would be combine a timestamp with the text of the previous block signed with the private key of the participant (e.g., OEM) who created the previous block/record 502*a*.

The fourth element 512 is the content (e.g., P-GW (fqdn)) which is provided back to the MME 310 (see FIGS. 3-4 step 6). In this example, the content is shown as plain-text (e.g., record 502*b*'s element 512 is "P-GW 192.168.2.1 Context Greece") but any other kind of encryption of the content could be applicable here. It should be appreciated that there are many different types of contexts that can influence the choice of the domain name 319*a*, 319*b* (e.g., P-GW (fqdn) 319*a* (shown), S-GW (fqdn) 319*b* (not shown)) such as the device's location (record 502*b*'s element 512), date (record 502*c*'s element 512), choice of operator (record 502*d*'s element 512), current load on the P-GW, etc. More contexts can also be taken into consideration if desired such as, e.g., subscription levels or different services that the device maybe using (i.e. Spotify, Netflix).

As shown, the block chain 319 (distributed ledger 319) is a collection of records 502*a*, 502*b*, 502*c*, 502*d* which are linked together within the distributed database 317. The information that is inserted in the records 502*a*, 502*b*, 502*c*, 502*d* is essentially added as a consequence of recent transactions carried about by the OEM in the block-chain. These transactions cannot be faked since they require a private key-public key relationship. The use of the DL 319 is one possible embodiment, in other embodiments other alternatives such as a plain database can be used. However, it is believed that the distributed ledger 319 and the associated block-chain techniques are more suitable to the this application since they allow for further transparency in this process thus enhancing trust. For example, in FIGS. 3-4's step 5 the information in the block-chain is queried by way of context and then in FIG. 3-4's step 6 the "most-recent" response is returned. The query is based on the MAC-address (or other hardware identifier) which in this example could be that of the Panasonic camera. The MAC-address (or other hardware identifier) has been inserted into the block chain 319 by the manufacturer of the device which has the UE 302 embedded therein. Depending on where the device is located, the time of the day or any other criteria referred to herein as context (which can be included in the query of FIG. 3-4's step 5)) is used to pick the relevant block 502*b* (for example) which would produce the corresponding P-GW (fqdn). In the same manner, the choice of S-GW could also be enhanced. To avoid the perpetual growth of the block chain 319, a central "trusted" authority could be introduced which could decide when to prune the block chain 319 (distributed ledger 319) that contains very old blocks 502a (for example). The introduction of such a central "trusted" authority is indeed "incorrect" based on the distributed ledger definition provided above since the central "trusted" authority may "corrupt" the clarity of the block chain 319 (distributed ledger 319). However, the central "trusted" authority could be needed to avoid redundant computations. Moreover, the central "trusted" authority can be extended to store act as backup of very old blocks as opposed to simply erasing them.

It should be appreciated that the telecommunications network 400 described above is configured per 4G communication standards due to the use of components such as the eNB 308, the MME 310, the P-GW 304, and the S-GW 320. However, the present disclosure is also applicable to other types of telecommunication networks that are associated with other types of communication standards such as, for example, 2G, 3G, LTE, GSM/EGPRS, WCDMA, WiMAX, or combinations thereof, etc. . . . Hence, generic terms for various components have been used herein such as: (1) a control node 310 which is a general term for MME 310, BSC 310, and RNC 310 (for example); (2) a radio base station 308 which is a general term for eNodeB 308, BTS 308, and nodeB 308, a wideband BTS 310 (for example); (3) a gateway 304, 320 which is a general term for P-GW 304, S-GW 320, SGSN 320, GGSN 304, MGW 304 (for example) (note: the BSC 310 communicates with a MSC and HLR to identify the gateway which in this case would be the GGSN 304, SGSN 320, and to implement the features of the present disclosure the HLR would need to be overridden by the distributed database 317, adapted to communicate to the distributed database 317, or adapted to include features of the distributed database 317). Furthermore, the term UE 302 as used herein can be defined to be any type of radio module such as a wireless device, mobile device, mobile station, end terminal, IoT device, MTC device (e.g., smart meter), a non-IoT/MTC device, a standalone wireless device, such as a terminal, a cell phone, a tablet, a smart phone, and a wireless-equipped personal digital assistant, as well as a wireless card or module that is designed for attachment to or insertion into another electronic device, such as a personal computer, electrical meter, etc. . . .

Referring to FIG. 6, there is a flowchart of a method 600 implemented in the control node 310 (e.g., MME 310, BSC 310, RNC 310) to assist in attaching the UE 302 to the telecommunication network 400 in accordance with an embodiment of the present disclosure. At step 602, the control node 310 receives, from the radio base station 308 (e.g., BTS 308, nodeB 308, eNodeB 308, wideband BTS 308), the network attach request 306 which comprises at least a hardware identifier associated with the UE 302 (see also FIGS. 3-4's step 4). The hardware identifier associated with the UE 302 can be one of following (for example): (1) a Media Access MAC) address (as discussed above); (2) a serial number of the device 303; (3) a globally unique Global Trading Item Number (GTIN) of the device 303; and (4) or Universal Product Code (UPC) of the device 303. At step 604, the control node 310 transmits, to the database 317 (e.g., distributed database 317, plain database 317), the lookup message 315 which comprises at least the hardware identifier associated with the UE (see also FIGS. 3-4's step 5). At step 606, the control node 310 receives, from the database 317, the domain name 319a, 319b of the gateway 304, 320 (e.g., P-GW 304, S-GW 320, GGSN 304, SGSN 320) (see also FIGS. 3-4's step 6). As discussed above, the manufacturer of the device 303 which has the UE 302 embedded therein would provide the database 317 with at least the following (1) the hardware identifier associated with the UE 302 and (2) the domain name 319a, 319b of the gateway 304, 320. Further, the manufacturer of the device 303 could also provide the database 317 with multiple context-based domain names 319a, 319b which are associated with multiple gateways 304, 320 where one of the context-based domain names 319a, 319b for one of the gateways 304, 320 is selected and provided to the control node 310 (see discussion with respect to FIG. 5). At step 608, the control node 310 transmits, to the DNS 314, the resolve message 321 including the domain name 319a, 319b of the gateway 304, 320 (e.g., P-GW 304, S-GW 320, GGSN 304, SGSN 320) (see also FIGS. 3-4's step 7). At step 610, the control node 310 receives, from the DNS 314, the IP address 323a, 323b of the gateway 304, 320 (e.g., P-GW 304, S-GW 320) (see also FIGS. 3-4's step 8). At step 612, the control node 310 establishes a session between the UE 310 and the gateway 304, 320 (e.g., P-GW 304, S-GW 320, GGSN 304, SGSN 320) which allows the UE 302 to communicate with the external network 328 (e.g., Internet 328) (see also FIGS. 3-4's steps 9-10). It should be appreciated that the control node 310 may request and utilize the domain name 319a of the gateway 304 (P-GW 304, GGSN 304), or the domain name 319b of the gateway 320 (S-GW 320, SGSN 320), or both domain names 319a, 319b of the gateways 304, 320 (P-GW 304, S-GW 320, GGSN 304, SGSN 320).

Referring to FIG. 7, there is a block diagram illustrating structures of an exemplary control node 310 (e.g., MME 310, BSC 310, RNC 310) in accordance with an embodiment of the present disclosure. In one embodiment, the control node 310 comprises a first receive module 702, a first transmit module 704, a second receive module 706, a second transmit module 708, a third receive 710, and an establish module 712. The first receive module 702 is configured to receive, from the radio base station 308 (e.g., BTS 308, nodeB 308, eNodeB 308, wideband BTS 308), the network attach request 306 which comprises at least a hardware identifier associated with the UE 302 (see also FIGS. 3-4's step 4). The first transmit module 704 is configured to transmit, to the database 317 (e.g., distributed database 317, plain database 317), the lookup message 315 which comprises at least the hardware identifier associated with the UE (see also FIGS. 3-4's step 5). The second receive module 706 is configured to receive, from the database 317, a domain name 319a, 319b of a gateway 304, 320 (e.g., P-GW 304, S-GW 320, GGSN 304, SGSN 320) (see also FIGS. 3-4's step 6). The second transmit module 708 is configured to transmit, to the DNS 314, the resolve message 321 including the domain name 319a, 319b of the gateway 304, 320 (e.g., P-GW 304, S-GW 320, GGSN 304, SGSN 320) (see also FIGS. 3-4's step 7). The third receive module 710 is configured to receive, from the DNS 314, the IP address 323a, 323b of the gateway 304, 320 (e.g., P-GW 304, S-GW 320, GGSN 304, SGSN 320) (see also FIGS. 3-4's step 8). The establish module 712 is configured to establish a session between the UE 310 and the gateway 304, 320 (e.g., P-GW 304, S-GW 320) which allows the UE 302 to communicate with the external network 328 (e.g., Internet 328) (see also FIGS. 3-4's steps 9-10). It should be appreciated that the control node 310 may request and utilize the domain name 319a of the gateway 304 (P-GW 304, GGSN 304), or the domain name 319b of the gateway 320 (S-GW 320, SGSN 320), or both domain names 319a, 319b of the gateways 304, 320 (P-GW 304, S-GW 320, GGSN 304, SGSN 320).

In addition, it should be appreciated that the control node 310 may also include other components, modules or structures which are well-known, but for clarity, only the components, modules or structures needed to describe the features of the present disclosure are described herein.

As those skilled in the art will appreciate, the above-described modules 702, 704, 706, 708, 710, and 712 of the control node 310 may be implemented separately as suitable dedicated circuits. Further, the modules 702, 704, 706, 708, 710, and 712 can also be implemented using any number of dedicated circuits through functional combination or separation. In some embodiments, the modules 702, 704, 706, 708, 710, and 712 may be even combined in a single application specific integrated circuit (ASIC). As an alternative software-based implementation, the control node 310 may comprise a processor 340 (including but not limited to a microprocessor, a microcontroller or a Digital Signal Processor (DSP), etc.), a memory 342, and a transceiver 344. The memory 342 stores machine-readable program code executable by the processor 340 to cause the control node 310 to perform the steps of the above-described method 600.

Referring to FIG. 8, there is a flowchart of a method 800 implemented in the database 317 (e.g., distributed database 317, plain database 317) to assist in attaching the UE 302 to the telecommunication network 400 in accordance with an embodiment of the present disclosure. At step 802, the database 317 receives, from the control node 310, the lookup message 315 which comprises at least the hardware identifier associated with the UE 302 (see FIGS. 3-4's step 5). At step 804, the database 317 looks-up, utilizing the at least the hardware identifier associated with the UE 302, the domain name 319a, 319b of the gateway 304, 320 (e.g., P-GW 304, S-GW 320, GGSN 304, SGSN 320), As discussed above, the manufacturer of the device 303 which has the UE 302 embedded therein would provide the database 317 with at least the following (1) the hardware identifier associated with the UE 302 and (2) the domain name 319a, 319b of the gateway 304, 320. Further, the manufacturer of the device 303 could also provide the database 317 with multiple context-based domain names 319a, 319b which are associated with multiple gateways 304, 320 where one of the context-based domain names 319a, 319b for one of the gateways 304, 320 is selected and provided to the control node 310 (see discussion above with respect to FIG. 5). If context-based domain names 319a, 319b are used then one of the context-based domain names 319a, 319b associated with one of the gateways 304, 320 would be looked-up (selected) based on a specific context (e.g., a location of the device 303, a date, a choice of operator, a current load on the gateway 304, 320, a subscription level of a service being used by the device 303) and returned to the control node 310). The information associated with a specific context could be provided in the lookup message 315 or otherwise determined by the database 317. At step 806, the database 317 transmits, to the control node 310, the domain name 319a, 319b of gateway 304, 320 (e.g., P-GW 304, S-GW 320, GGSN 304, SGSN 320) (see FIGS. 3-4's step 6). It should be appreciated that the control node 310 may request and utilize the domain name 319a of the gateway 304 (P-GW 304, GGSB 304), or the domain name 319b of the gateway 320 (S-GW 320, SGSN 320), or both domain names 319a, 319b of the gateways 304, 320 (P-GW 304, S-GW 320, GGSN 304, SGSN 320).

Referring to FIG. 9, there is a block diagram illustrating structures of an exemplary database 317 (e.g., distributed database 317, plain database 317) in accordance with an embodiment of the present disclosure. In one embodiment, the database 317 comprises a receive module 902, a lookup module 904, and a transmit module 906. The receive module 902 is configured to receive, from the control node 310, the lookup message 315 which comprises at least the hardware identifier associated with the UE 302 (see FIGS. 3-4's step 5). The lookup module 904 is configured to look-up, utilizing the at least the hardware identifier associated with the UE 302, the domain name 319a, 319b of the gateway 304, 320 (e.g., P-GW 304, S-GW 320, GGSN 304, SGSN 320). The transmit module 906 is configured to transmit, to the control node 310, the domain name 319a, 319b of gateway 304, 320 (e.g., P-GW 304, S-GW 320, GGSN 304, SGSN 320) (see FIGS. 3-4's step 6). It should be appreciated that the database 317 may be requested to lookup and provide the domain name 319a of the gateway 304 (P-GW 304, GGSN 304), or the domain name 319b of the gateway 320 (S-GW 320, SGSN 320), or both domain names 319a, 319b of the gateways 304, 320 (P-GW 304, S-GW 320, GGSN 304, SGSN 320). Further, it should be appreciated that the database 317 may also include other components, modules or structures which are well-known, but for clarity, only the components, modules or structures needed to describe the features of the present disclosure are described herein.

As those skilled in the art will appreciate, the above-described modules 902, 904, and 906 of the database 317 may be implemented separately as suitable dedicated circuits. Further, the modules 902, 904, and 906 can also be implemented using any number of dedicated circuits through functional combination or separation. In some embodiments, the modules 902, 904, and 906 may be even combined in a single application specific integrated circuit (ASIC). As an alternative software-based implementation, the database 317 may comprise a processor 350 (including but not limited to a microprocessor, a microcontroller or a Digital Signal Processor (DSP), etc.), a memory 352, and a transceiver 354. The memory 352 stores machine-readable program code executable by the processor 350 to cause the database 317 to perform the steps of the above-described method 800.

In view of the foregoing, one skilled in the art will appreciate that the present disclosure has many advantages some of which are as follows:

The approach of the present disclosure due to the advanced and trusted nature associated with the database 317 and in particular the distributed database 317 enables a more efficient routing of internet traffic.

Any P-GW 304 or S-GW 320 can be selected per the present disclosure and not only the officially sanctioned ones (e.g., operator owned P-GWs, S-GWs) which are typically limited by contractual agreements.

The regular mechanism available in the telecommunications network 400 such as Policy and Charging Rules Function (PCRF) and Charging/Billing solutions can still be used with the approach of the present disclosure.

The present disclosure enables an OEM to control their own devices 303 while enabling the telecommunication's operator to manage all other necessities needed as the device 303 joins its telecommunication network 400.

The present disclosure enables an external vendor (OEM) to control their own devices 303 by means of a hardware identifier (e.g., MAC address). For instance, this can be done with the use of the distributed ledger 319 where the external vendor (OEM) can submit criteria that influence the selection of the P-GW 304 (for example), thus directing traffic to their own P-GWs 304 as opposed to using the P-GWs that have been defined by the operator of the telecommunications network 400. Moreover, this hardware identifiers and criteria information is communicated to all operators transparently and globally.

The present disclosure allows traffic for a device 303 to be transferred to a "better suited" P-GW 304 (for example). For instance, Panasonic (OEM) can have its own PG-Ws 304 in different countries to support local users of their devices 303. Thus, when a Panasonic camera 303 that was bought in the US moves to Europe, the data that the camera 303 transmits will now go the P-GW 304 in Europe instead of the P-GW 304 in US since the P-GW 304 in Europe will be selected. Panasonic can do this simply by participating in populating the distributed ledger 319 which is introduced in the present disclosure without having to make any arrangement with any operator of a telecommunication network. Prior to the present disclosure, Panasonic would have to engage in a series of agreements with operators of telecommunication networks around the globe. This use of the distributed ledger 319 also enables Panasonic (OEM) to provide a certain quality-of-service to their customers that own the devices 303 which have come to expect a certain quality-of-service and usually hold the OEM accountable to provide this quality of service.

In the above-description of various embodiments of the present disclosure, it is to be understood that the terminology used herein is for the purpose of describing particular embodiments only and is not intended to be limiting of the disclosure. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

The tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present disclosure may be embodied in hardware and/or in software (including firmware, resident software, microcode, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Of course, the present disclosure may be carried out in other specific ways than those herein set forth without departing from the scope and essential characteristics of the disclosure. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Furthermore, at least a portion of an example network architecture disclosed herein may be virtualized as set forth above and architected in a cloud-computing environment comprising a shared pool of configurable virtual resources. Skilled artisans will also appreciate that such a cloud-computing environment may comprise one or more of private clouds, public clouds, hybrid clouds, community clouds, distributed clouds, multiclouds and interclouds (e.g., "cloud of clouds", and the like.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the present disclosure.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A control node configured to assist in attaching a user equipment (UE) to a telecommunication network, the control node comprising:
 a processor; and,
 a memory that stores processor-executable instructions, wherein the processor interfaces with the memory to execute the processor-executable instructions, whereby the control node is operable to:
  receive, from a radio base station, a network attach request, wherein the network attach request comprises at least a hardware identifier associated with the UE;
  transmit, to a database, a lookup message which comprises at least the hardware identifier associated with the UE;
  receive, from the database, a domain name of a gateway, wherein the at least the hardware identifier associated with the UE and the domain name was provided to the database by a manufacturer of a device which has the UE embedded therein;
  transmit, to a Domain Name Server (DNS), a resolve message including the domain name of the gateway;
  receive, from the DNS, an Internet Protocol (IP) address of the gateway; and,
  establish a session between the UE and the gateway.

2. The control node of claim 1, wherein the hardware identifier associated with the UE comprises one of following: (1) a Media Access Control (MAC) address; (2) a serial number of the device; (3) a globally unique Global Trading Item Number (GTIN) of the device; and (4) or Universal Product Code (UPC) of the device.

3. The control node of claim 1, wherein the domain name of the gateway is a context-based domain name.

4. The control node of claim 1, wherein:
 the control node is a Mobility Management Entity (MME);
 the radio base station is an eNodeB (eNB); and,
 the gateway is a Packet Gateway (P-GW) or a Serving Gateway (S-GW).

5. A method implemented by a control node to assist in attaching a user equipment (UE) to a telecommunication network, the method comprising:
 receiving, from a radio base station, a network attach request, wherein the network attach request comprises at least a hardware identifier associated with the UE;
 transmitting, to a database, a lookup message which comprises at least the hardware identifier associated with the UE;
 receiving, from the database, a domain name of a gateway, wherein the at least the hardware identifier associated with the UE and the domain name was provided to the database by a manufacturer of a device which has the UE embedded therein;
 transmitting, to a Domain Name Server (DNS), a resolve message including the domain name of the gateway;
 receiving, from the DNS, an Internet Protocol (IP) address of the gateway; and,
 establishing a session between the UE and the gateway.

6. The method of claim 5, wherein the hardware identifier associated with the UE comprises one of following: (1) a Media Access Control (MAC) address; (2) a serial number of the device; (3) a globally unique Global Trading Item Number (GTIN) of the device; and (4) or Universal Product Code (UPC) of the device.

7. The method of claim 5, wherein the domain name of the gateway is a context-based domain name.

8. The method of claim 5, wherein:
the control node is a Mobility Management Entity (MME);
the radio base station is an eNodeB (eNB); and,
the gateway is a Packet Gateway (P-GW) or a Serving Gateway (S-GW).

9. A database configured to assist in attaching a user equipment (UE) to a telecommunication network, the database comprising:
a processor; and,
a memory that stores processor-executable instructions, wherein the processor interfaces with the memory to execute the processor-executable instructions, whereby the database is operable to:
receive, from a control node, a lookup message which comprises at least the hardware identifier associated with the UE;
lookup, utilizing the at least the hardware identifier associated with the UE, a domain name of a gateway, wherein the at least the hardware identifier associated with the UE and the domain name was provided to the database by a manufacturer of a device which has the UE embedded therein; and,
transmit, to the control node, the domain name of the gateway.

10. The database of claim 9, wherein the domain name of the gateway is a context-based domain name.

11. The database of claim 10, wherein the lookup operation further includes using a context to select the context-based domain name of the gateway from a plurality of context-based domain names associated with a plurality of gateways all of which are associated with the hardware identifier associated with the UE.

12. The database of claim 11, wherein the context comprises one of following: (1) a location of the device; (2) a date; (3) a choice of operator; (4) a current load on the gateway; and (5) a subscription level of a service being used by the device.

13. The database of claim 11, wherein the database is a distributed database comprising a distributed ledger with a plurality of records, wherein each of the records comprises the hardware identifier associated with the UE and one of the context-based domain names of one of the gateways.

14. The database of claim 13, wherein each of the records comprises:
a first element which is populated with an indicator that identifies the manufacturer;
a second element which is populated with the hardware identifier associated with the UE;
a third element which is populated with a pointer to a previously written record; and,
a fourth element which is populated with one of the context-based domain names associated with one of the gateways, wherein the manufacturer creates each of the records to assign the device which has the UE embedded therein with a gateway for a particular context.

15. The database of claim 9, wherein the hardware identifier associated with the UE comprises one of following: (1) a Media Access Control (MAC) address; (2) a serial number of the device; (3) a globally unique Global Trading Item Number (GITN) of the device; and (4) or Universal Product Code (UPC) of the device.

16. A method implemented by a database to assist in attaching a user equipment (UE) to a telecommunication network, the method comprising:
receiving, from a control node, a lookup message which comprises at least the hardware identifier associated with the UE;
looking-up, utilizing the at least the hardware identifier associated with the UE, a domain name of a gateway, wherein the at least the hardware identifier associated with the UE and the domain name was provided to the database by a manufacturer of a device which has the UE embedded therein; and,
transmitting, to the control node, the domain name of the gateway.

17. The method of claim 16, wherein the domain name of the gateway is a context-based domain name.

18. The method of claim 17, wherein the lookup operation further includes using a context to select the context-based domain name of the gateway from a plurality of context-based domain names associated with a plurality of gateways all of which are associated with the hardware identifier associated with the UE.

19. The method of claim 18, wherein the context comprises one of following: (1) a location of the device; (2) a date; (3) a choice of operator; (4) a current load on the gateway; and (5) a subscription level of a service being used by the device.

20. The method of claim 18, wherein the database is a distributed database comprising a distributed ledger with a plurality of records, wherein each of the records comprises the hardware identifier associated with the UE and one of the context-based domain names of one of the gateways.

21. The method of claim 20, wherein each of the records comprises:
a first element which is populated with an indicator that identifies the manufacturer;
a second element which is populated with the hardware identifier associated with the UE;
a third element which is populated with a pointer to a previously written record; and,
a fourth element which is populated with one of the context-based domain names associated with one of the gateways, wherein the manufacturer creates each of the records to assign the device which has the UE embedded therein with a gateway for a particular context.

22. The method of claim 16, wherein the hardware identifier associated with the UE comprises one of following: (1) a Media Access Control (MAC) address; (2) a serial number of the device; (3) a globally unique Global Trading Item Number (GITN) of the device; and (4) or Universal Product Code (UPC) of the device.

23. The control node of claim 1, wherein the database has records in which the domain name of the gateway is associated with the hardware identifier of the UE, and wherein the gateway is not sanctioned by an operator of the telecommunication network.

24. The method of claim 5, wherein the database has records in which the domain name of the gateway is associated with the hardware identifier of the UE, and wherein the gateway is not sanctioned by an operator of the telecommunication network.

25. The database of claim 9, wherein the database has records in which the domain name of the gateway is associated with the hardware identifier of the UE, and wherein the gateway is not sanctioned by an operator of the telecommunication network.

26. The method of claim 16, wherein the database has records in which the domain name of the gateway is associated with the hardware identifier of the UE, and wherein the gateway is not sanctioned by an operator of the telecommunication network.

\* \* \* \* \*